US012649578B2

(12) United States Patent　　　　(10) Patent No.: US 12,649,578 B2

Milks et al.　　　　　　　　　　　　(45) Date of Patent: Jun. 9, 2026

(54) INFANT/TODDLER RESTRAINT SYSTEM FOR LAVATORY

(71) Applicant: B/E Aerospace, Inc., Winston Salem, NC (US)

(72) Inventors: James Milks, Hinckley, OH (US); Glen Shaw, Colorado Springs, CO (US); Scott Marley, Edmonds, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 162 days.

(21) Appl. No.: 18/500,827

(22) Filed: Nov. 2, 2023

(65) Prior Publication Data

US 2025/0145295 A1　　　May 8, 2025

(51) Int. Cl.
| | |
|---|---|
| *A47C 9/06* | (2006.01) |
| *B60N 2/90* | (2018.01) |
| *B64D 11/02* | (2006.01) |
| *B64D 11/06* | (2006.01) |

(52) U.S. Cl.
CPC ........... B64D 11/0612 (2014.12); A47C 9/06 (2013.01); B60N 2/986 (2018.02); B60N 2/99 (2018.02); B64D 11/02 (2013.01)

(58) Field of Classification Search
CPC .......... A47C 7/407; A47C 9/06; B60N 2/986; B60N 2/99; B60N 2002/0288; B64D 11/02; B64D 11/0612
USPC ...... 297/14, 16.1, 16.2, 17, 254, 255, 284.9, 297/465, 467, 250.1, 452.34, 452.36; D6/333
See application file for complete search history.

(56) References Cited

U.S. PATENT DOCUMENTS

| | | | | | |
|---|---|---|---|---|---|
| 2,359,599 A | * | 10/1944 | Allen | ..................... | B60N 2/283 |
| | | | | | 297/255 X |
| 2,851,084 A | * | 9/1958 | Benjetsky | ............ | B60N 2/2839 |
| | | | | | 297/254 |
| 2,852,066 A | * | 9/1958 | Hawkins | ................ | B60N 2/283 |
| | | | | | 297/255 X |
| 3,062,583 A | * | 11/1962 | Hamilton | ............. | B60N 2/2839 |
| | | | | | 297/254 X |

(Continued)

FOREIGN PATENT DOCUMENTS

| | | | |
|---|---|---|---|
| CN | 201030231019.X | * | 1/2011 |
| CN | 209826523 | | 12/2019 |

(Continued)

OTHER PUBLICATIONS

European Patent Office, European Partial Search Report dated Dec. 2, 2024 in Application No. 24205678.6.

(Continued)

*Primary Examiner* — Rodney B White

(74) *Attorney, Agent, or Firm* — SNELL & WILMER L.L.P.

(57) ABSTRACT

A child restraint system may provide a seat and restraint system for a child in an aircraft lavatory. The child restraint system may be configured to be installed on an existing wall such as a wall of an aircraft lavatory or be manufactured as part of an aircraft lavatory. The child restraint system may be a rigid structure comprising a seat back, a seat bottom, a first seat side, a second seat side, and a harness. The child restraint system may be a flexible or fabric structure. The child restraint system may comprise a seat, a first strap, and a second strap.

12 Claims, 9 Drawing Sheets

(56) References Cited

U.S. PATENT DOCUMENTS

| | | | | |
|---|---|---|---|---|
| 3,288,502 | A * | 11/1966 | Romay | A47D 1/103 297/255 X |
| 3,594,037 | A * | 7/1971 | Sherman | A47C 7/56 297/14 |
| 3,690,525 | A * | 9/1972 | Koons | B60N 2/283 297/254 |
| 3,873,151 | A * | 3/1975 | Morris | A47K 3/282 297/14 |
| 3,992,028 | A * | 11/1976 | Abe | B60N 2/283 297/254 X |
| 4,460,215 | A * | 7/1984 | Chamberlain | A47C 9/06 297/14 |
| 4,568,125 | A * | 2/1986 | Sckolnik | A47D 1/103 297/465 X |
| 4,580,832 | A * | 4/1986 | Maruyama | B60N 2/305 297/14 |
| 4,582,362 | A * | 4/1986 | Kassai | A47D 15/006 297/467 X |
| 4,718,717 | A * | 1/1988 | Cruz | A47D 1/0085 297/331 |
| 4,723,493 | A * | 2/1988 | Siani | A47D 1/02 297/14 |
| 4,902,070 | A * | 2/1990 | Casale | A47D 11/02 297/238 X |
| 4,993,666 | A * | 2/1991 | Baymak | B64D 11/0691 297/14 |
| 5,031,960 | A * | 7/1991 | Day | B60N 2/286 297/254 X |
| 5,118,163 | A * | 6/1992 | Brittian | B64D 11/0612 297/254 |
| 5,183,315 | A * | 2/1993 | Takahashi | A47D 1/00 297/464 |
| D333,923 | S * | 3/1993 | Dainty | D6/333 |
| 5,222,641 | A * | 6/1993 | Medeiros, Jr. | A47D 13/025 297/255 X |
| 5,310,242 | A * | 5/1994 | Golder | A47D 1/10 297/14 |
| 5,344,212 | A * | 9/1994 | Muller | B60N 2/28 297/14 |
| 5,362,123 | A * | 11/1994 | Simmons | A47D 1/02 297/14 |
| 5,395,154 | A * | 3/1995 | Wang | B60N 2/2218 297/17 X |
| 5,499,860 | A * | 3/1996 | Smith | A47D 1/02 297/255 X |
| 5,791,729 | A * | 8/1998 | McCormick | A47C 9/06 297/14 |
| 5,845,876 | A | 12/1998 | Zach, Sr. | |
| D411,065 | S * | 6/1999 | Davis | D6/333 |
| 6,474,732 | B1 * | 11/2002 | Merensky | B64D 11/0612 297/14 |
| 7,080,417 | B2 * | 7/2006 | Jiang | A47C 9/06 297/14 X |
| 7,188,899 | B1 | 3/2007 | McClellan-Derrickson | |
| 7,222,820 | B2 | 5/2007 | Wentland et al. | |
| 7,472,964 | B2 * | 1/2009 | King | A47D 13/025 297/255 X |
| D598,664 | S * | 8/2009 | Giampavolo | D6/333 |
| 7,631,935 | B2 * | 12/2009 | Chen | B60N 2/2851 297/284.9 X |
| D629,218 | S * | 12/2010 | Li | D6/333 |
| D650,597 | S * | 12/2011 | Lehman | D6/333 |
| 8,136,880 | B2 * | 3/2012 | Biaud | B60N 2/2872 297/250.1 X |
| 8,152,236 | B1 * | 4/2012 | Romero | A47D 1/10 297/16.2 X |
| D682,563 | S * | 5/2013 | Goldberg | D6/333 |
| 8,579,372 | B2 * | 11/2013 | Wessman | B60N 2/2809 297/255 X |
| 8,651,571 | B1 * | 2/2014 | Richardson | A47D 1/004 297/217.7 |
| 9,981,747 | B2 * | 5/2018 | Savian | A47K 4/00 |
| 10,293,944 | B2 * | 5/2019 | Spagl | B64D 11/0698 |
| 10,575,658 | B2 * | 3/2020 | Romero | A47D 1/10 |
| 10,807,720 | B2 * | 10/2020 | Pacheco | B64D 11/0698 |
| 10,807,721 | B2 * | 10/2020 | Bakhsh | B60N 2/3045 |
| 11,052,794 | B2 * | 7/2021 | Hunsaker | B60N 2/26 |
| D928,519 | S * | 8/2021 | Fu | D6/333 |
| 11,465,753 | B2 * | 10/2022 | Lokanatha | B60N 2/3027 |
| 12,053,554 | B2 * | 8/2024 | Childress | A61L 2/10 |
| 12,165,864 | B2 * | 12/2024 | Childress | E03D 9/00 |
| 12,245,697 | B2 * | 3/2025 | Wolf | A47C 9/06 |
| 12,251,022 | B2 * | 3/2025 | Odom | A47C 4/04 |
| 12,383,640 | B2 * | 8/2025 | Brockschmidt, Jr. | A61L 2/10 |
| 2008/0018152 | A1 * | 1/2008 | Vadai | B60N 2/0284 297/255 X |
| 2013/0106154 | A1 * | 5/2013 | Buie | A47C 9/06 297/217.1 |
| 2013/0313365 | A1 * | 11/2013 | Ehlers | B64D 11/0698 244/118.6 |
| 2014/0368012 | A1 * | 12/2014 | Burd | B64D 25/04 297/337 |
| 2015/0251762 | A1 * | 9/2015 | Ehlers | B64D 11/064 244/118.6 |
| 2020/0139858 | A1 | 5/2020 | Gardner et al. | |

FOREIGN PATENT DOCUMENTS

| | | | | |
|---|---|---|---|---|
| DE | 19545245 | A1 * | 10/1996 | B60N 2/272 |
| WO | 2004076279 | | 9/2004 | |

OTHER PUBLICATIONS

European Patent Office, European Search Report dated Feb. 24, 2025 in Application No. 24205678.6.

European Patent Office, European Office Action dated Apr. 9, 2026 in Application No. 24205678.6.

* cited by examiner

FIG 6A                    FIG 6B

INFANT/TODDLER RESTRAINT SYSTEM FOR LAVATORY

FIELD

The present disclosure generally relates to child restraint systems and, more particularly, to child restraint systems for aircraft lavatories.

BACKGROUND

Air travel with an infant or toddler can be difficult given the need for close supervision. This presents an issue when using an aircraft lavatory, as one would need to supervise the infant or toddler while using the lavatory in a limited space.

SUMMARY

Disclosed herein is an infant and toddler restraint system. In various embodiments, the present disclosure provides for a child restraint system which may comprise a seat back configured to be attached to an aircraft lavatory wall. In various embodiments, the child restraint system may comprise a first seat side coupled at a first joint to a first edge of the seat back and a second seat side coupled at a second joint to a second edge of the seat back. In various embodiments, the child restraint system may comprise a seat bottom located substantially perpendicular to the first seat side and to the second seat side and rotatably coupled to at least one of the first seat side, the second seat side, or the seat back. In various embodiments, the child restraint system may comprise a rotation stop configured to prevent the seat bottom from rotating past a substantially perpendicular angle with respect to the seat back.

In various embodiments, the child restraint system further comprises a harness. The harness may comprise a first attachment point located on the seat bottom, a second attachment point located on the seat back, a third attachment point located on the seat back, and a first harness strap connecting the first attachment point to the second attachment point.

In various embodiments, the first edge of the seat back is a first vertical edge and the second edge of the seat back is second vertical edge.

In various embodiments, the rotation stop may be the harness itself.

In various embodiments, the rotation stop may be a mechanical feature separate from the harness itself. The rotation stop may be rotatably coupled to at least one of the first seat side, the second seat side, or the seat back.

In various embodiments, the first harness strap may also connect the first attachment point to the third attachment point.

In various embodiments, the first harness strap may be adjustable.

In various embodiments, the child restraint system further comprises a second harness strap connecting the first attachment point to the third attachment point, wherein the second harness strap is adjustable.

The present disclosure also provides for a child restraint system comprising a seat. The child restraint system may also comprise a first strap coupled to a first point of the seat and configured to provide a first load to a first wall hook, wherein the first wall hook is configured to be installed such that in response to a first load, the first wall hook rotates from a first closed position to a first open position. The child restraint system may also comprise a second strap coupled to a second point of the seat and configured to provide a second load to a second wall hook, wherein the second wall hook is configured to be installed such that in response to a second load, the second wall hook rotates from a second closed position to a second open position.

In various embodiments, the seat of the child restraint system may be a flexible seat. The seat of the child restraint system may be a fabric seat.

In various embodiments, the first hook may be configured to be installed into a first recess of a wall and the second hook is configured to be installed into a second recess of the wall.

In various embodiments, the child restraint system may comprise a third point of the seat configured to prevent the seat from at least one of rotating or swinging.

In various embodiments, the child restraint system may comprise a fourth point of the seat configured to prevent the seat from at least one of rotating or swinging.

In various embodiments, the child restraint system may comprise a padded headrest.

The present disclosure also provides for an aircraft lavatory comprising a first wall, a seat back integrally formed with the first wall, a first seat side coupled at a first joint of the seat back, a second seat side coupled at a second joint of the seat back, a seat bottom located substantially perpendicular to the first seat side and to the second seat side, and a rotation stop configured to prevent the seat bottom from rotating past a substantially perpendicular angle with respect to the seat back. The seat bottom may be rotatably coupled to at least one of the first seat side, the second seat side, or the seat back.

In various embodiments, the aircraft lavatory may further comprise a harness. The harness may comprise a first attachment point located on the seat bottom, a second attachment point located on the seat back, a third attachment point located on the seat back, and a first harness strap connecting the first attachment point to the second attachment point.

In various embodiments, the first seat side, the second seat side, and the seat bottom of the aircraft lavatory are configured to fold against the wall.

In various embodiments, the first seat side, the second seat side, and the seat bottom are configured to fold into the wall such that the seat back, the first seat side, and the seat bottom do not protrude from the wall in a closed position.

In various embodiments, the first seat side has a first cutout and the second seat side has a second cutout. In various embodiments, the first cutout and the second cutout aid in rotating the first seat side and the second seat side from a closed position to an open position.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a child restraint system designed for infants and young children. In various embodiments, the child restraint system secures a child to the wall of a lavatory. In various embodiments, the child restraint system is light weight. In various embodiments, the child restraint system folds easily so to minimally or nearly minimally intrude on the interior space of an aircraft lavatory. In various embodiments, the child restraint system may fold against a lavatory wall. In various embodiments, the child restraint system is beneficial for adults traveling with small children to have a place to secure a small child while using the lavatory.

Figure 1:
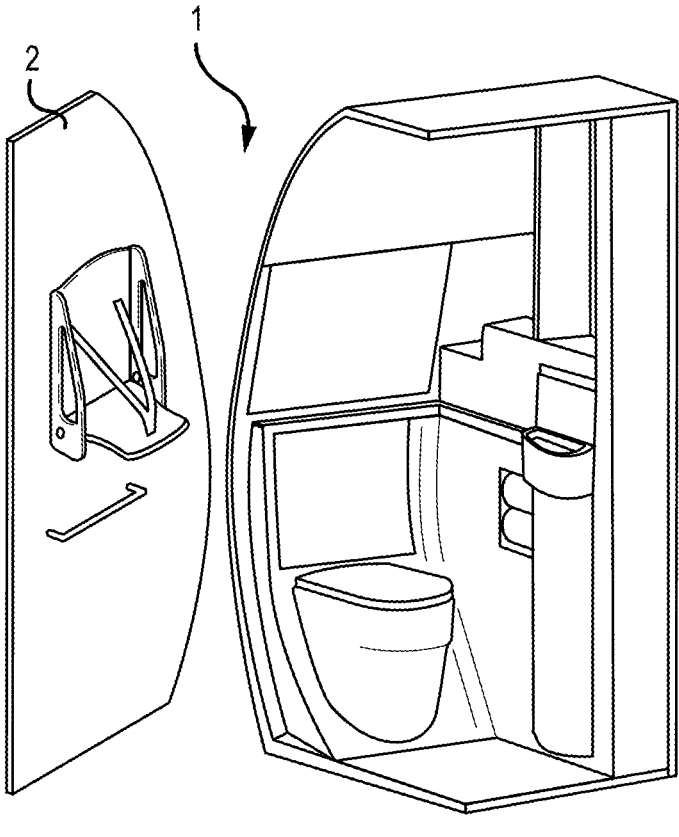
FIG. 1 illustrates an aircraft lavatory, in accordance with various embodiments.

In various embodiments, the child restraint system is configured to be installed onto or into a wall. In various embodiments, the child restraint system is configured to be retrofit into an aircraft lavatory wall. With initial reference to FIG. 1, the child restraint system may be configured to be installed on an existing wall such as a wall 2 of an aircraft lavatory 1. The system may be manufactured as part of an aircraft lavatory 1.

Figures 2A, 2B:
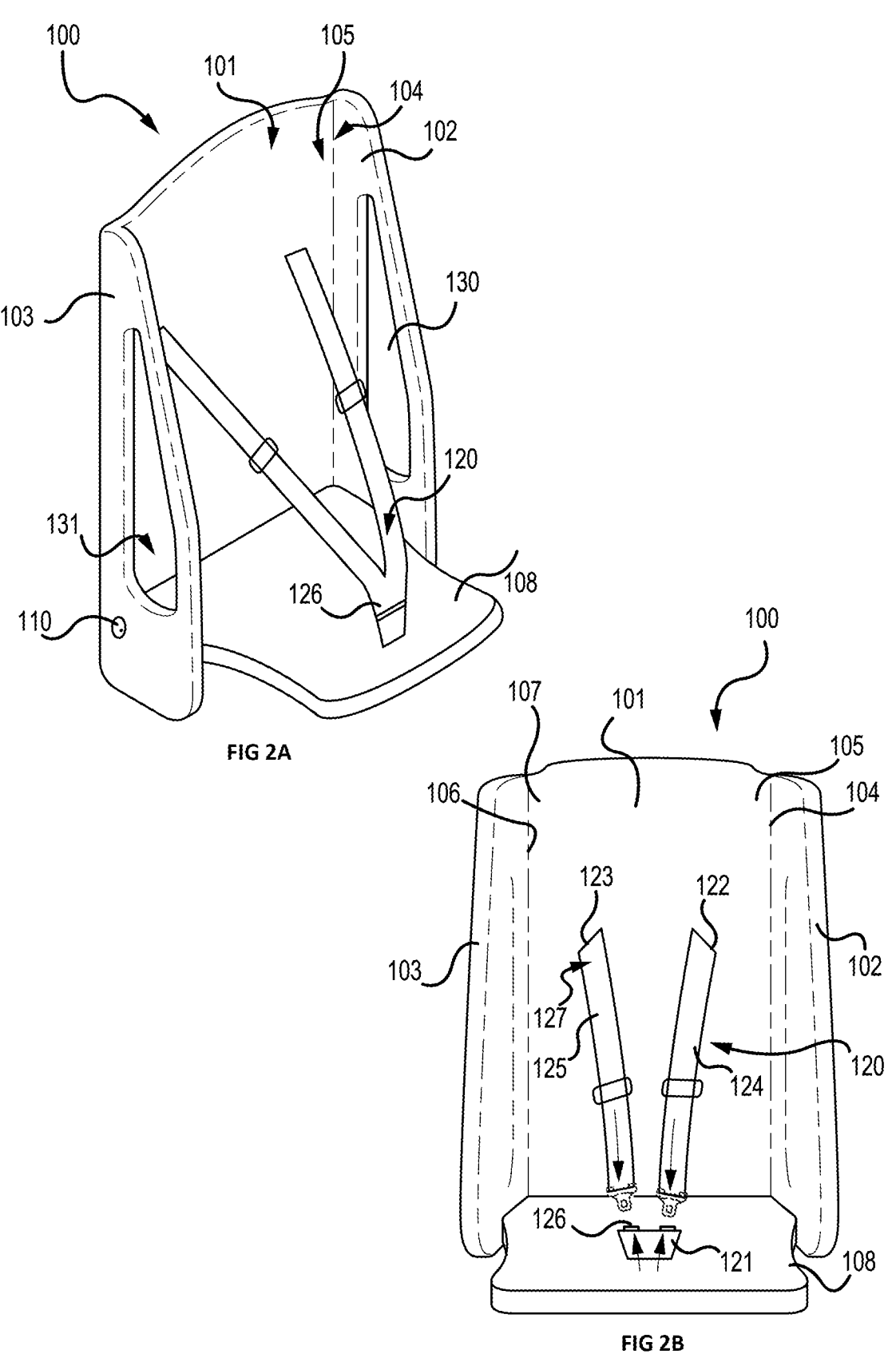
FIG. 2A illustrates a child restraint system, in accordance with various embodiments.
FIG. 2B illustrates a child restraint system comprising a first harness strap and a second harness strap, in accordance with various embodiments.

With initial reference to FIGS. 2A and 2B, child restraint system 100 is illustrated. Child restraint system 100 is rigid. With momentary reference to FIG. 5, child restraint system 200 is a flexible and comprises a fabric structure.

In various embodiments and with reference to FIG. 2A, child restraint system 100 may comprise a seat back 101, first seat side 102, and second seat side 103. The seat back 101 may be rigid. The seat back 101 may be manufactured from thermoplastic, thermosets, wood, fiberglass, composite materials, or any other suitable material capable of supporting the weight of the child and child restraint system while installed. The seat back 101 may comprise a padded surface made of nylon, polyester, vinyl, or any other material that can provide a soft or padded surface to support a child.

The first seat side 102 may have a first edge 105. The first seat side 102 may be coupled to the seat back 101 at a first joint 104 located along the first edge 105. The second seat side 103 may have a second edge 107. The second seat side 103 may be coupled to the seat back 101 at a second joint 106 located along the second edge 107. The first seat side 102 and the second seat side 103 may be substantially perpendicular to the seat back 101. The first seat side 102 and the second seat side 103 may be monolithically formed with the seat back 101. In various embodiments, the first seat side 102 and the second seat side 103 may be rotatably coupled to the seat back 101. The first seat side 102 and the second seat side 103 may be manufactured from thermoplastic, thermosets, wood, fiberglass, composite materials, or any other suitable material. The first seat side 102 and the second seat side 103 may comprise a padded surface made of nylon, polyester, vinyl, or any other material that can provide a soft or padded surface.

With reference to FIG. 2B, in various embodiments the first seat side 102 may have a solid, continuous outer surface. With reference to FIG. 2A, in various embodiments, the first seat side 102 has a first cutout 130. The first cutout 130 may be configured to act as a handle in rotating the first seat side 102. The first cutout 130 may extend partially into the first seat side 102. The first cutout 130 may extend completely though the first seat side 102. With reference to FIG. 2B, in various embodiments, the second seat side 103 may have a solid, continuous outer surface. With reference to FIG. 2A, in various embodiments, the second seat side has a second cutout 131. The second cutout 131 may be configured to act as a handle in rotating the second seat side 103. The second cutout 131 may extend partially into the second seat side 103. The second cutout 131 may extend completely though the second seat side 103.

In continued reference to FIGS. 2A and 2B, the child restraint system 100 has a seat bottom 108. The seat bottom 108 may be configured to hold the weight of a toddler or small child. The seat bottom 108 may be a rigid structure. The seat bottom 108 may be rotatable with respect to the seat back 101. The seat bottom 108 may be manufactured from thermoplastic, thermosets, wood, fiberglass, composite materials, or any other suitable material. The seat bottom 108 may comprise a padded surface made of nylon, polyester, vinyl, or any other material that can provide a soft or padded surface.

Figure 2C:
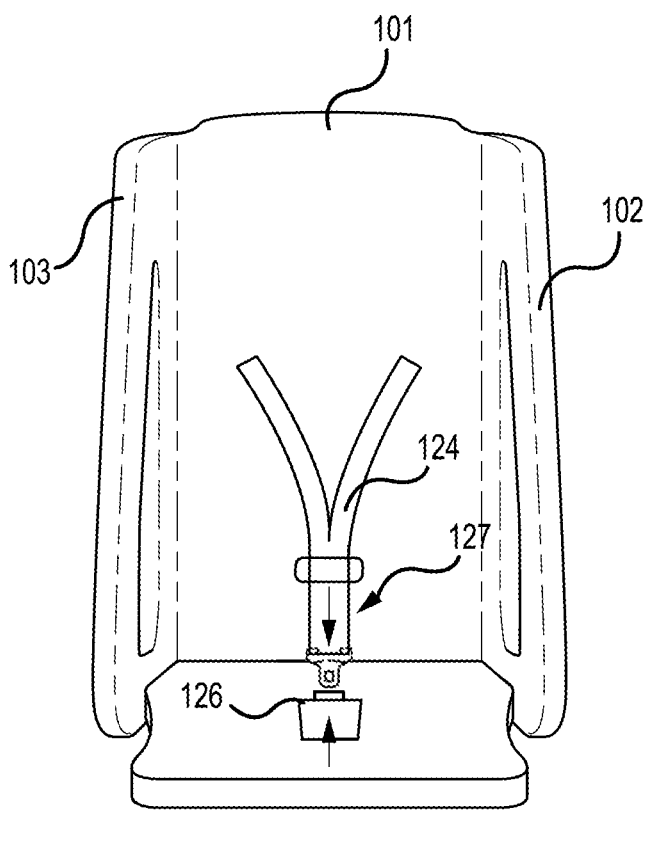
FIG. 2C illustrates a child restraint system comprising a first harness strap, in accordance with various embodiments.

In various embodiments, and with reference to FIGS. 2A-2C, the child restraint system 100 may comprise a harness 120. The harness 120 may comprise a first attachment point 121 located on the seat bottom 108. The first attachment point 121 may anchor the harness 120 to the seat bottom 108. The harness 120 may comprise a second attachment 122 point located on the seat back 101. The harness 120 may comprise a third attachment point 123 located on the seat back 101. The second attachment point 122 and the third attachment point 123 may anchor the harness 120 to the seat back 101. The harness 120 may comprise a first harness strap 124. The first harness strap 124 may connect the first attachment point 121 to the second attachment point 122. In various embodiments, and with particular reference to FIG. 2C, the first harness strap 124 may also connect the first attachment point 121 to the third attachment point 123. In various embodiments, and with particular reference to FIG. 2B, the harness 120 may comprise a second harness strap 125. The first harness strap 124 may connect the first attachment point 121 to the second attachment point 122. The second harness strap 125 may connect the first attachment point 121 to the third attachment point 123. With reference to FIGS. 2A and 2B, the first harness strap 124 may be adjustable. The second harness strap 125 may be adjustable. The harness 120, including in various embodiments the first harness strap 124 and in further embodiments the first harness strap 124 and the second harness strap 125, may comprise webbing, nylon, polyester, or any other material suitable for holding the weight of a child and safely restraining a child within a seat.

The harness 120 may contain a coupling feature 126. The coupling feature 126 may comprise a buckle, a clasp, a snap, a tie, or any other device which fastens the harness safely and securely around a child's body. In various embodiments and with reference to FIG. 2C, the coupling feature 126 need only comprise a single buckle, snap, tie, or other device which fastens the first harness strap 124 safely and securely around a child's body. In various embodiments and with reference to FIG. 2B, the coupling feature 126 may comprise multiple buckles, snaps, ties, or other device which fastens the first harness strap 124 and the second harness strap 125 safely and securely around a child's body.

The harness 120, first harness strap 124, second harness strap 125, or coupling feature 126 may comprise at least one dampening feature 127. The harness, first harness strap, second harness strap or coupling feature may each comprise a dampening feature. The dampening feature 127 may comprise elastic features such as elastic, rubber, elastic with excess nylon, etc. such that the dampening feature may provide for comfort and shock absorption in the event of turbulence or aircraft movement.

With reference to FIGS. 3A-4B, the seat bottom 108 of the child restraint system 100 may be rotatably coupled via a rotatable joint 109. The rotatable joint 109 may be a hinge, a pivot, a rod, a torsion spring, etc. As pictured in FIGS. 3A and 4A, the rotatable joint 109 may be a hinge 109a. As pictured in FIG. 3B, the rotatable joint 109 may be a rod 109b. In various embodiments, the seat bottom 108 of the child restraint system 100 may be rotatably coupled to the first seat side 102. In various embodiments, the seat bottom 108 of the child restraint system 100 may be rotatably coupled to the second seat side 103. In various embodiments, the rotatable joint 109 may comprise a rod coupled to the seat bottom 108 and coupled to both the first seat side 102 and the second seat side 103. In various embodiments, the seat bottom 108 of the child restraint system 100 may be rotatably coupled to the seat back 101. In various embodiments, the rotatable joint 109 may be a hinge, a pivot, a torsion spring, or other rotating feature along a seam between the seat bottom 108 and the seat back 101.

In various embodiments, the seat bottom 108 may have an open position. In an open position, the seat bottom 108 may be substantially perpendicular to the seat back 101 and substantially perpendicular to the first seat side 102 and substantially perpendicular to the second seat side 103. In various embodiments, the seat bottom 108 may have a closed position. In a closed position, the seat bottom 108 may be substantially parallel with the seat back 101.

In various embodiments, the child restraint system 100 may comprise a rotation stop 110. The rotation stop 110 may be configured to prevent the seat bottom 108 from rotating past a substantially perpendicular angle with respect to the seat back 101 when in an open position. In this manner, the rotation stop 110 ensures the seat bottom 101 will support the weight of a toddler or small child when the toddler or small child is seated in the child restraint system 101. In various embodiments, the rotation stop may be the harness 120. In other words, the harness 120 may be attached to the seat bottom 108 and to the seat back 101 such that the harness 120 prevents the seat bottom 108 from rotating past a safe position for the child when in an open position. In various embodiments, and in accordance with FIGS. 3A and 3B, the rotation stop 110 may be a mechanical feature separate from the harness 120. The rotation stop 110 may be incorporated into the rotatable joint 109. For example, if the rotatable joint 109 comprises a rod coupled to the seat bottom 108 and fixed to the first seat side 102 and the second seat side 103, the rotation stop 110 may be located where the seat bottom 108 is fixed to the first seat side 102 or the second seat side 103. For example, the rotation stop 110 may be a pin 110a and groove 110b along the rotatable joint 109 that prevents 360-degree rotation. With respect to FIG. 3A, a pin 110a may be located at a first groove position in the closed position. With respect to FIG. 3B, the pin 110a may be located at a second groove position in the open position. In various embodiments, the geometry of the pin 110a and groove 110b may bound rotation between the first groove position and the second groove position. As another example, if the rotatable joint 109 couples the seat bottom 108 to the seat back 101, the rotatable joint 109 may be a hinge along the seam of the seat bottom 108 and the seat back 101. In various embodiments, the rotation stop 110 may be an angle restrictor 110c that limits the opening angle of the hinge. For example, if the rotatable joint 109 is a torsion spring, the rotation stop 110 may be inherent to the torsion spring. For example, the torsion spring may require an extreme force, greater than the weight of a child, to rotate past an open position.

Figures 3A, 3B, 4A, 4B:
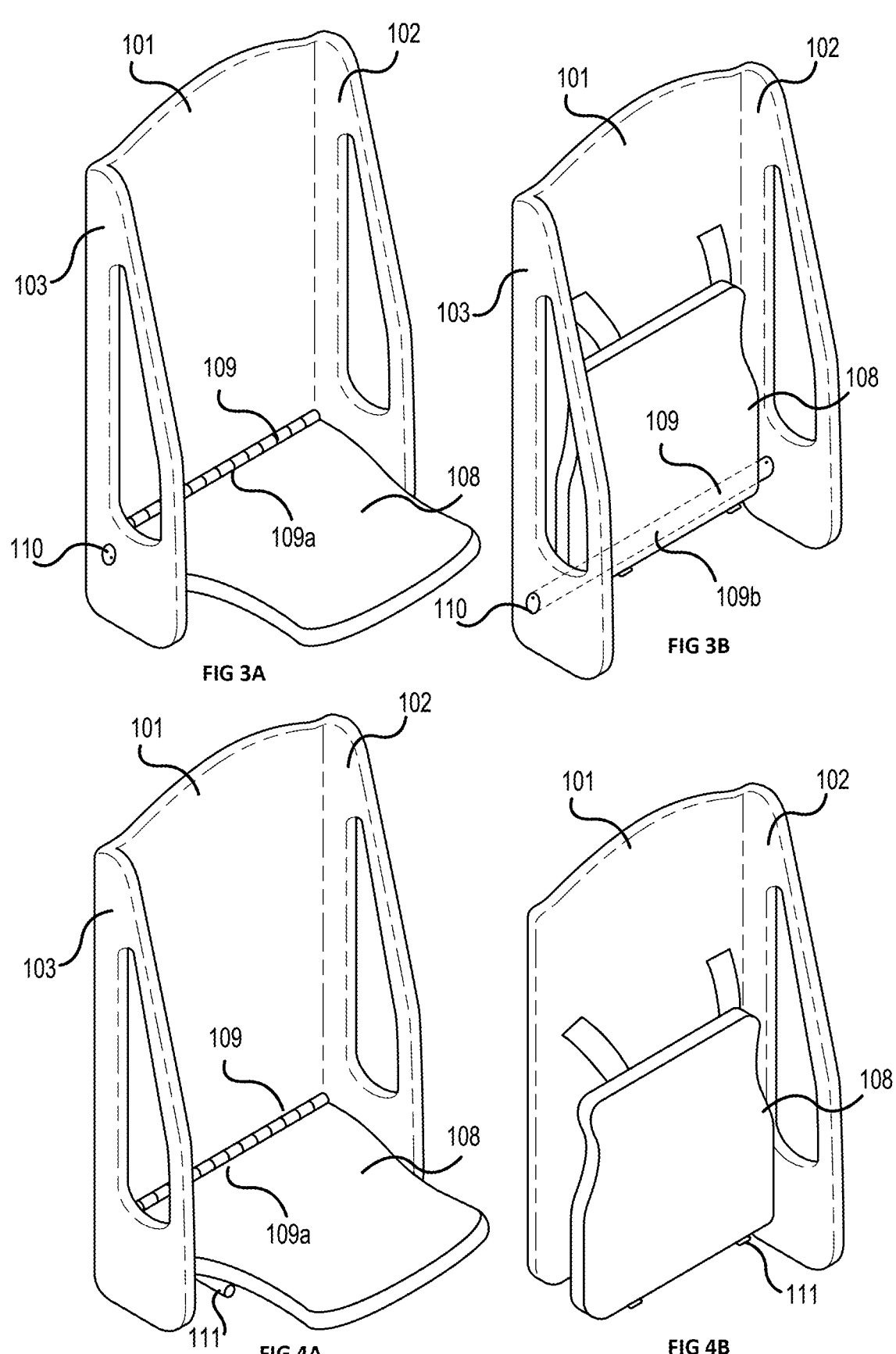
FIG. 3A illustrates a child restraint system comprising a rotation stop in an open position, in accordance with various embodiments.
FIG. 3B illustrates a child restraint system comprising a rotation stop in a closed position, in accordance with various embodiments.
FIG. 4A illustrates a child restraint system comprising a rotation stop in an open position, in accordance with various embodiments.
FIG. 4B illustrates a child restraint system comprising a rotation stop in a closed position, in accordance with various embodiments.

In various embodiments and with reference to FIGS. 4A and 4B, rotation stop 111 may be similar in function to rotation stop 110 in that rotation stop 111 prevents the seat bottom 108 from rotating past a safe position for a seated child. However, rotation stop 111 may be a structure located separately from the rotatable joint 109. For example, rotation stop 111 may be a fixed structure such as a block 111*a* located beneath the seat bottom 108. For example, if the rotatable joint 109 couples the seat bottom 108 to the seat back 101, rotation stop 111 may be pin 111*a* and groove 111*b* coupling between the seat bottom 108 and the first seat side 102 or the second seat side 103.

Figure 5:
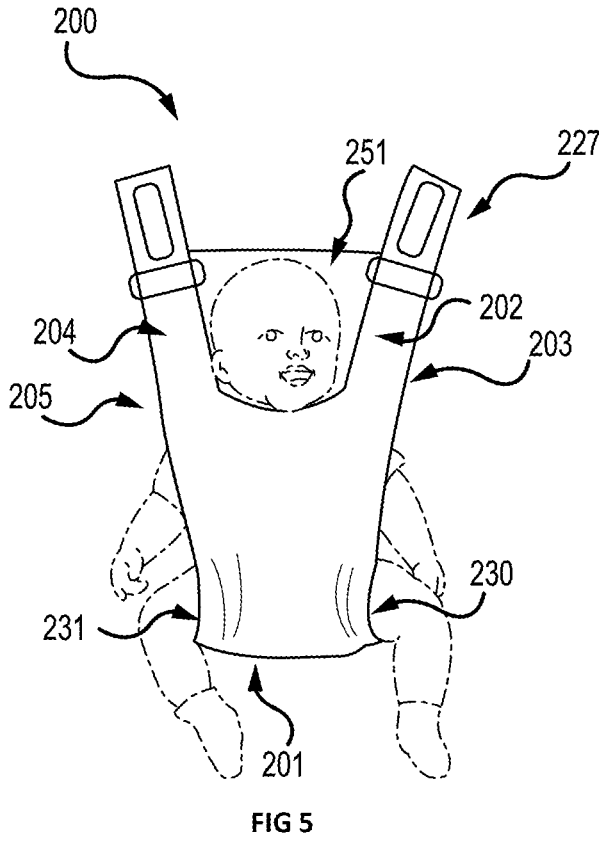
FIG. 5 illustrates a child restraint system, in accordance with various embodiments.

With reference to FIG. 5, in various embodiments the child restraint system 200 may be flexible. The child restraint system 200 may comprise a fabric material. The child restraint system 200 may comprise cotton, hemp, nylon, ballistic nylon, silk, polyester, vinyl, or any other suitable material.

With continued reference to FIG. 5, the child restraint system 200 may comprise a seat 201. The seat 201 may have a first opening 230 and a second opening 231 through which a child's feet or legs can fit. The seat 201 may be a fabric support comprising cotton, hemp, nylon, ballistic nylon, silk, polyester, vinyl, or any other suitable material which supports a child in an upright position.

In various embodiments, the child restraint system 200 may comprise a first strap 202 coupled to a first point 203 of the seat 201. The child restraint system 200 may comprise a second strap 204 coupled to a second point 205 of the seat 201. The first strap 202 and second strap 204 may be a fabric support comprising cotton, polyester, vinyl, or any other suitable material which supports a child in an upright position. The first strap 202 and second strap 204 may be reinforced with additional fabric layers and/or metal brackets.

Figure 6:
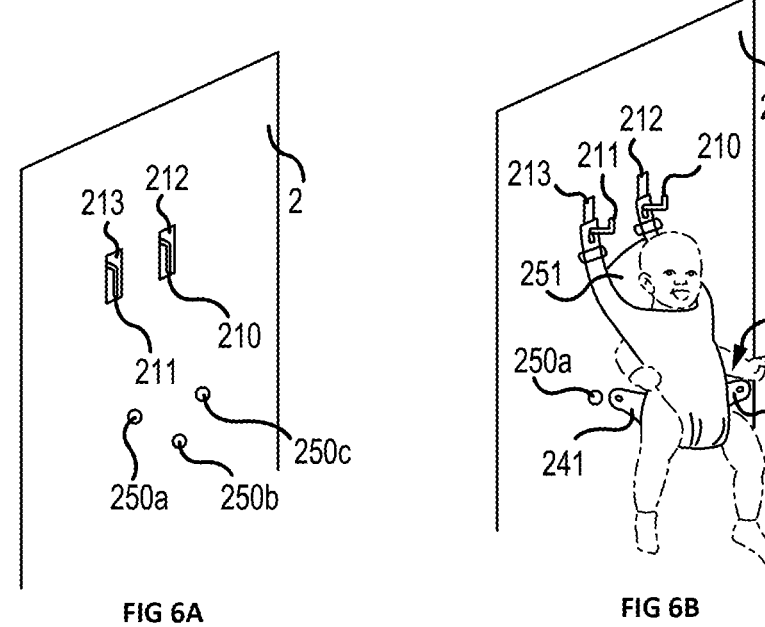
FIG. 6A illustrates a first wall hook and a second wall hook recessed into a wall, in accordance with various embodiments.
FIG. 6B illustrates a child restraint system, in accordance with various embodiments.

With reference to FIGS. 5-6B, the first strap 202 may be configured to provide a first load to a first wall hook 210. The second strap 204 may be configured to provide a second load to a second wall hook 211.

With reference to FIG. 6A, the first wall hook 210 may be configured to rotate into a first position in response to being unloaded. The first wall hook 210 in the first position may be flush with a wall 2. The first wall hook 210 in the first position may be located in a first recess 212 of a wall 2. With reference to FIG. 6B, in response to a load, such as the first load from the first strap 202, the first wall hook 210 may be configured to rotate from the first recess 212 in the wall 2 to a second position. The first wall hook 210 may be at a substantially orthogonal angle to the wall 2 in the second position. The first wall hook 210 may be at an acute angle from the wall 2 in the second position.

With reference to FIG. 6A, the second wall hook 211 may be configured to rotate into a third position in response to being unloaded. The second wall hook 211 in the third position may be flush with a wall 2. The second wall hook 211 in the third position may be located in a second recess 213 of a wall 2. With reference to FIG. 6B, in response to a load, such as the second load from the second strap 204, the second wall hook 211 may be configured to rotate from the second recess 213 in the wall 2 to a fourth position. The second wall hook 211 may be at a substantially orthogonal angle to the wall 2 in the fourth position. The second wall hook 211 may be at an acute angle from the wall 2 in the fourth position. With reference.

With reference to FIG. 6B, the child restraint system 200 may have various points to secure seat 201 to wall 2 to prevent seat 201 from swinging or rotating due to movement of the aircraft. The child restraint system 200 may have a third point 240 of the seat 201 configured to prevent the seat 201 from swinging or rotating. The third point 240 may be any configuration to aid in preventing swinging or rotating. The third point 240 may comprise a buckle, a strap, a snap, or any other fixture to anchor the seat 201 to the wall 2. The third point 240 may be on a bottom of the seat 201. The third point 240 may be on a first side of the seat 201. The child restraint system 200 may have a fourth point 241 of the seat 201 configured to prevent the seat 201 from swinging or rotating. The fourth point 241 may be any configuration to aid in preventing swinging or rotating. The fourth point 241 may comprise a buckle, a strap, a snap, or any other fixture to anchor the seat 201 to the wall 2. The fourth point 241 may be on the bottom of the seat 201. The fourth point 241 may be on a second side of the seat 201. Third point 240 and/or fourth point 241 may be configured to attach to a corresponding anchor point 245 on wall 2. In that regard, four points of attachment to wall 2 allows seat 201 to be restrain child movement, even during aircraft turbulence. Each point (e.g., third point 240 and fourth point 241) may have a corresponding anchor point 250 on wall 2.

The child restraint system 200 may comprise at least one dampening feature 227. The dampening feature 227 may comprise elastic features such as elastic, rubber, elastic with excess nylon, etc. such that the dampening feature may provide for comfort and shock absorption in the event of turbulence or aircraft movement. The dampening feature 227 may be located anywhere within the child restraint system 200 that provides for comfort and shock absorption. For example, the seat 201, first strap 202, second strap 204, the first point 203, second point 205, third point 240, or fourth point 241 may each comprise a dampening feature 227.

With reference to FIGS. 5 and 6B, the child restraint system 200 may comprise a headrest 251. The headrest 251 may be fabric. The headrest 251 may be padded. The headrest 251 may prevent a child's head from engaging a wall 2 in an aircraft lavatory 1. The headrest 251 may provide support to an infant's head.

Figure 7:
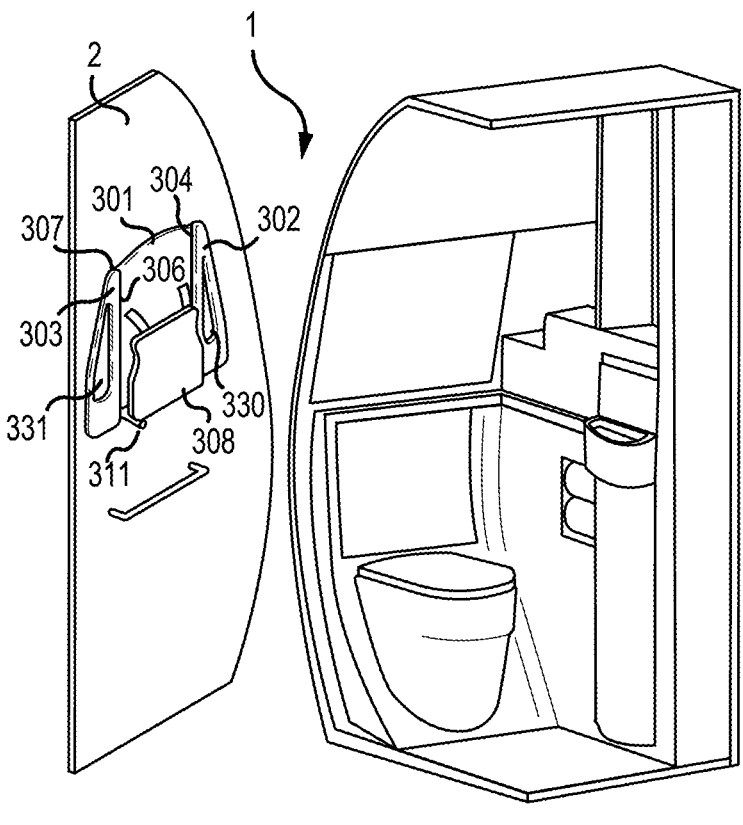
FIG. 7 illustrates an aircraft lavatory comprising a child restraint system, in accordance with various embodiments.
Figure 8:
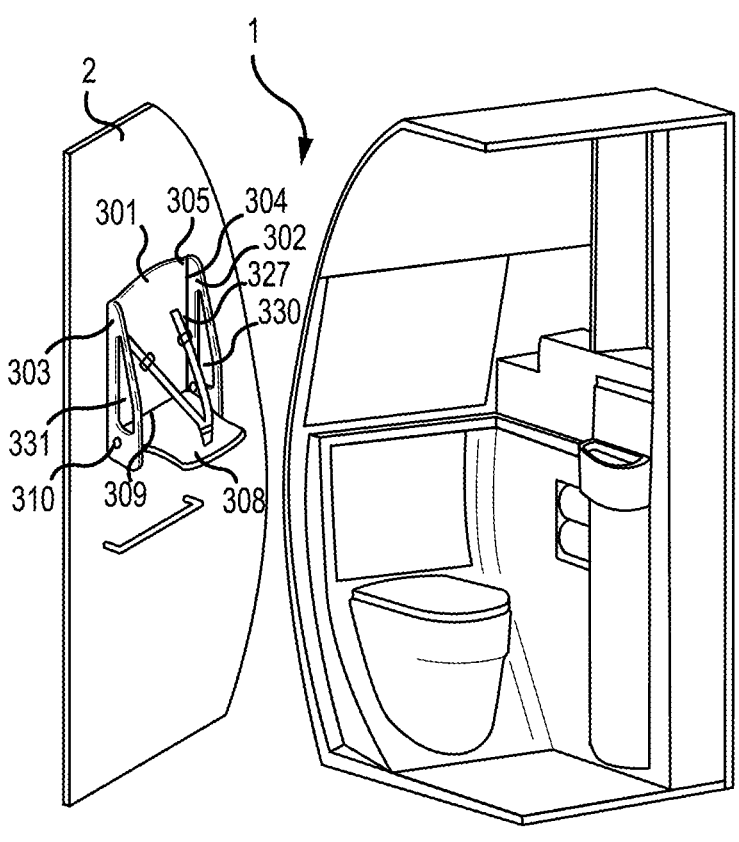
FIG. 8 illustrates an aircraft lavatory comprising a child restraint system, in accordance with various embodiments.

With reference to FIGS. 7 and 8, in various embodiments, an aircraft lavatory may comprise a child restraint system 300. With respect to FIGS. 7 and 8, elements with like element numbering, as depicted in FIGS. 2A-2C, are intended to be the same and will not necessarily be repeated for the sake of clarity. The child restraint system 300 may be similar to and comprise similar components as the child restraint system 100. The child restraint system 300 may be integrally formed with a wall 2. The seat back 301 may be flush with the wall 2. The seat back 301 may be recessed into the wall 2. The seat back 301 may protrude from the wall 2.

With reference to FIG. 7, the first seat side 302 and the second seat side 303 may be rotatably coupled to the seat back 301 such that, when the child restraint system 300 is not in use, the first seat side 301 and the second seat side 302 may be folded toward the wall 2. In various embodiments, the first seat side 301, the second seat side 302, and the seat bottom 308 of the child restraint system 300 are configured to fold into the wall 2 such that the seat back 301, the first seat side 302, the second seat side 303, and the seat bottom 308 do not protrude or do not substantially protrude from the wall 2 in a closed position. In this context only, substantially protrude means protrudes from wall 2 by more than 0.25 inches (6.35 mm).

Figures 9A, 9B:
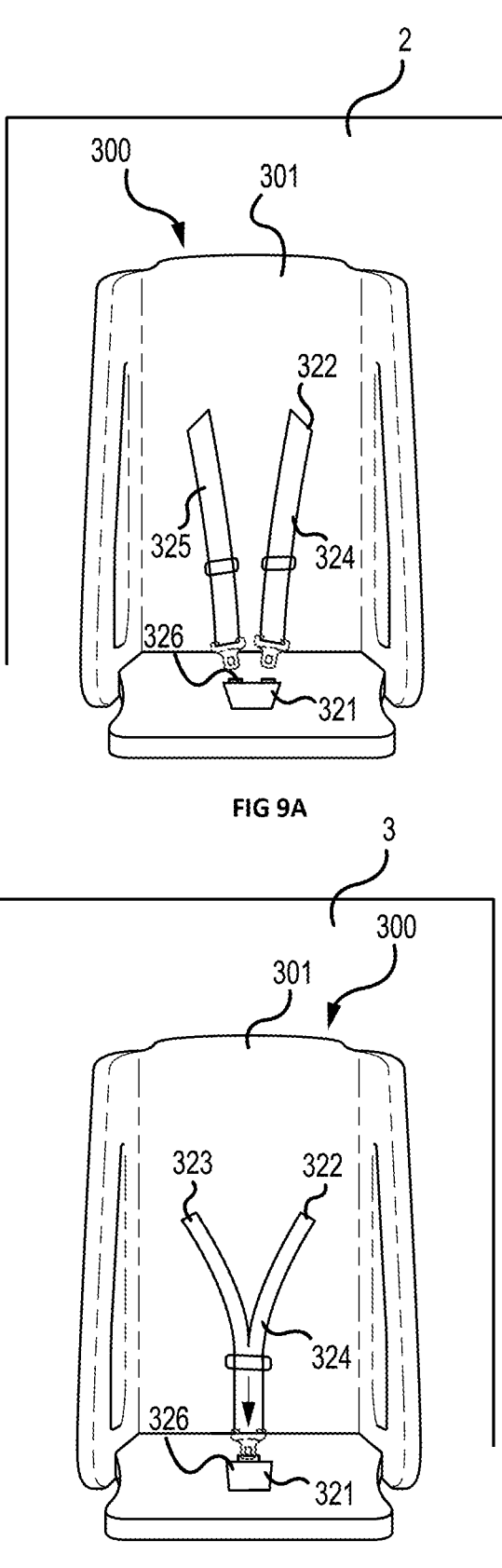
FIG. 9A illustrates a child restraint system comprising a first harness strap and a second harness strap, in accordance with various embodiments.
FIG. 9B illustrates a child restraint system comprising a first harness strap, in accordance with various embodiments.

With reference to FIGS. 9A and 9B, an aircraft lavatory may comprise a child restraint system 300 with a seat back 301 monolithically formed with wall 2. With respect to FIGS. 9A and 9B, elements with like element numbering, as depicted in FIGS. 2A-2C, are intended to be the same and will not necessarily be repeated for the sake of clarity. Seat back 301 is monolithically formed with wall 3. In that regard, wall 3 may be manufactured directly with child restraint system 300 as a monolithic, integral part. This reduces the need for fasteners to fasten seat back 301 to wall 3 and allows for even greater mechanical stability for an occupant of child restraint system 300.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A child restraint system, comprising:
   a seat;
   a first strap coupled to a first point of the seat and configured to provide a first load to a first wall hook, wherein the first wall hook is configured to be installed such that in response to a first load, the first wall hook rotates from a first closed position to a first open position; and
   a second strap coupled to a second point of the seat and configured to provide a second load to a second wall hook, wherein the second wall hook is configured to be installed such that in response to a second load, the second wall hook rotates from a second closed position to a second open position.

2. The child restraint system of claim 1, wherein the seat is a flexible seat.

3. The child restraint system of claim 1, wherein the seat is a fabric seat.

4. The child restraint system of claim 1, wherein the first hook is configured to be installed into a first recess of a wall and the second hook is configured to be installed into a second recess of the wall.

5. The child restraint system of claim 1, further comprising a third point of the seat configured to prevent the seat from at least one of rotating or swinging.

6. The child restraint system of claim 5, further comprising a fourth point of the seat configured to prevent the seat from at least one of rotating or swinging.

7. The child restraint system of claim 1, further comprising a padded headrest.

8. An aircraft lavatory, comprising:
   a first wall;
   a seat back integrally formed with the first wall;
   a first seat side coupled at a first joint of the seat back;
   a second seat side coupled at a second joint of the seat back;
   a seat bottom located substantially perpendicular to the first seat side and to the second seat side, and rotatably coupled to at least one of the first seat side, the second seat side, or the seat back; and
   a rotation stop configured to prevent the seat bottom from rotating past a substantially perpendicular angle with respect to the seat back.

9. The aircraft lavatory of claim 8, further comprising:
   a harness comprising:
      a first attachment point located on the seat bottom;
      a second attachment point located on the seat back;
      a third attachment point located on the seat back; and
      a first harness strap connecting the first attachment point to the second attachment point.

10. The aircraft lavatory of claim 8, wherein the first seat side, the second seat side, and the seat bottom are configured to fold against the wall.

11. The aircraft lavatory of claim 8, wherein the first seat side, the second seat side, and the seat bottom are configured to fold into the wall such that the seat back, the first seat side, and the seat bottom do not protrude from the wall in a closed position.

12. The aircraft lavatory of claim 8, wherein the first seat side has a first cutout and the second seat side has a second cutout, and wherein the first cutout and the second cutout aid in rotating the first seat side and the second seat side from a closed position to an open position.

* * * * *